United States Patent [19]
Okano

[11] Patent Number: 5,161,142
[45] Date of Patent: Nov. 3, 1992

[54] DISK PLAYING APPARATUS FOR PLAYING CLV DISKS

[75] Inventor: Takashi Okano, Tokorozawa, Japan

[73] Assignee: Pioneer Electronic Corporation, Tokyo, Japan

[21] Appl. No.: 551,493

[22] Filed: Jul. 11, 1990

[30] Foreign Application Priority Data

Aug. 1, 1989 [JP] Japan .................................. 1-199884

[51] Int. Cl.⁵ ................................................ G11B 7/00
[52] U.S. Cl. ......................................... 369/50; 369/54; 369/58; 369/124
[58] Field of Search .................. 369/50, 58, 32, 44.28, 369/44.14, 104, 36, 37, 38, 39, 54, 124; 360/77.03, 77.02, 73.01, 73.03, 73.05

[56] References Cited

U.S. PATENT DOCUMENTS

| | | | |
|---|---|---|---|
| 4,873,679 | 10/1989 | Murai et al. | 369/50 |
| 4,896,311 | 1/1990 | Ishihara | 369/50 |
| 4,980,783 | 12/1990 | Moir et al. | 360/77.02 |

Primary Examiner—Roy N. Envall, Jr.
Assistant Examiner—Muhammad Edun
Attorney, Agent, or Firm—Perman & Green

[57] ABSTRACT

An apparatus for playing CLV disks is provided with a speed signal generator for generating a speed signal having a frequency corresponding to the rotational speed of the disk, and the rotation of the disk is controlled so that the frequency of the speed signal equals to a predetermined frequency independently of the radial position of an information reading point of a pickup, thereby the period of a search operation of the apparatus is shortened.

7 Claims, 5 Drawing Sheets

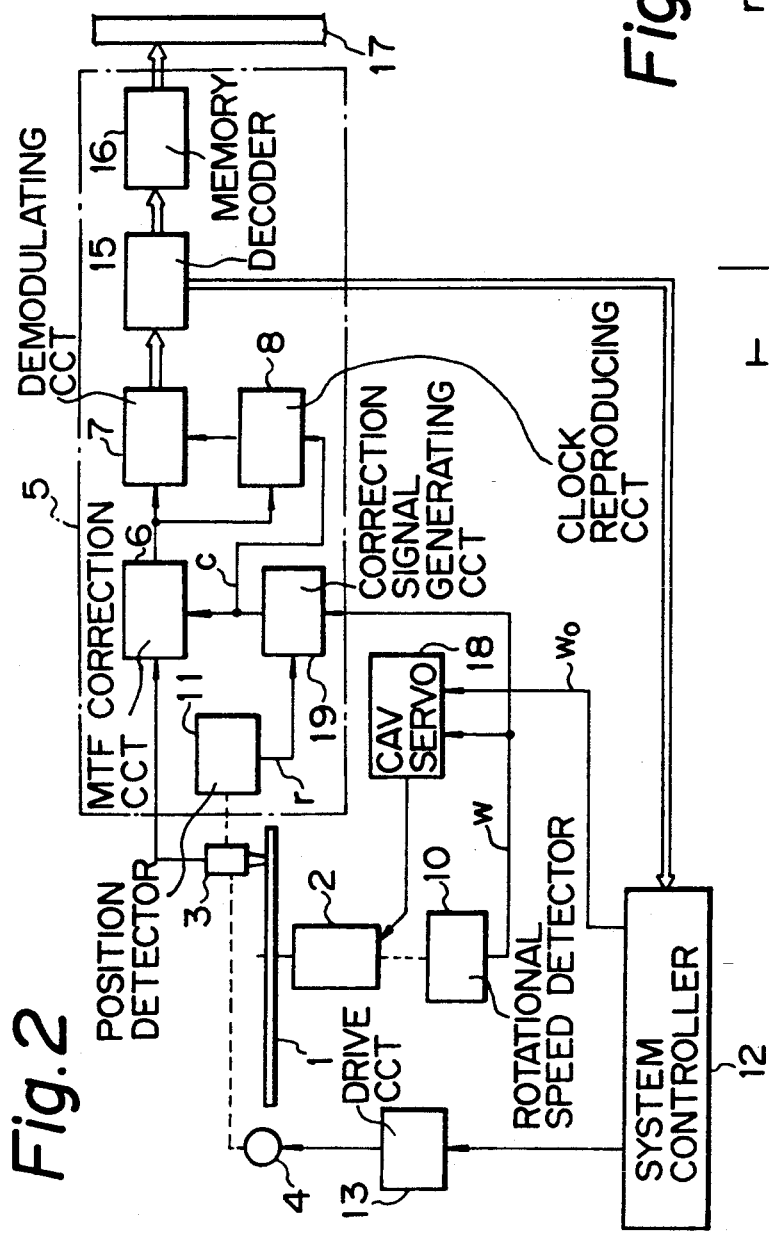
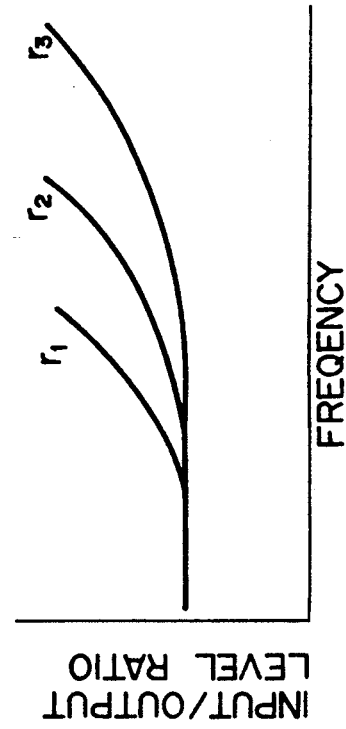

DISK PLAYING APPARATUS FOR PLAYING CLV DISKS

BACKGROUND OF THE INVENTION

1. Field of the Invention

The present invention relates to a disk playing apparatus, and more particularly relates to a disk playing apparatus for playing the so-called CLV disk.

2. Description of Background Information

As the method for recording a signal along a track on a disk-shaped recording carrier, the constant angular velocity (CAV) mode and constant linear velocity (CLV) mode are generally used.

In the field of the optical video disk, there coexist CAV disks and CLV disks which are produced according the CAV and CLV modes respectively. On the other hand, only CLV disks exist in the case of digital audio disks. The advantage of the CAV disks is that the angular velocity of the rotation of the disk is constant independently of the position of an information reading point of the pickup. This means it is unnecessary to change the rotational speed of the disk even if the pickup is rapidly translated in a radial direction for searching particular address information, and the signal detection from the disk is performed in a stable manner simply by maintaining the rotation of the disk at a constant speed. Therefore, the CAV disks are suited for applications in which a high speed search operation is required. Furthermore, because it is unnecessary to change the rotational speed of the spindle motor for rotating the disk in relation to the search operation, the power source for driving the motor need not have a large capacity.

When a CLV disk is played, conversely, the normal speed of rotation of the disk changes depending on a relative position (referred to as radial position hereinafter) of the information reading point of the pickup in the radial direction of the disk. Therefore, it is necessary to use a spindle motor and a driving power source which can rapidly accelerate and decelerate the disk in uses in which the search operation is to be performed quickly. Furthermore, since the capability of the spindle motor to follow changes in the rotational speed is limited, a time period is required before the rotation of the spindle motor becomes stable at a desired linear velocity. This has been imposing a limitation to raise the speed of the search operation. In addition, if the search operation is performed frequently, the electric power supplied to the spindle motor becomes several times higher than the normal value. This in turn results in problems of the generation of heat and vibrations caused by torque variations, and measures must be taken to eliminate such problems.

However, with CLV disks, there is an advantage that the recording area of the disk which cannot be increased is efficiently used. Specifically, information can be recorded on a CLV disk twice as much as information recordable on a CAV disk.

The CLV recording method is used in CD-ROM disks and CD-I disks which have the same format as the digital audio disk. Therefore, the problems peculiar to the CLV disk are also experienced when data is retrieved by searching information recorded on a data disk of these kinds. For constructing a system providing large amount of information requiring a plurality of disks, it is necessary to use a plurality of spindle motors for the plurality of disks (a spindle motor for each disk), contrasting with the case of the CAV disk in which a plurality of disks can be driven by a single spindle motor. This has been an obstacle in reducing the size of the apparatus or reducing the cost.

OBJECT AND SUMMARY OF THE INVENTION

The present invention is based on the points described above, and an object of the present invention is to provide a disk playing apparatus in which the speed of search is increased while preventing the generation of heat and vibrations of the motor, and by which the reduction of the size and cost of a large scale disk memory system using a plurality of disks is achieved.

A disk playing apparatus for playing CLV disks according to the present invention is provided with a rotational speed detection means which generates a velocity signal having a frequency corresponding to the rotational speed of the disk, and the disk is rotated so that the frequency of the velocity signal coincides with a predetermined frequency.

In the disk playing apparatus for playing CLV disks according to the present invention, the control of the rotational speed is performed so that the disk is rotated at a desired angular velocity independently of the radial position of the information reading point of reading means.

BRIEF DESCRIPTION OF THE DRAWINGS

FIG. 2 is a block diagram showing an embodiment of the disk playing apparatus according to the present invention;

FIG. 3 is a graph showing the characteristic of the MTF correction circuit 6;

DETAILED DESCRIPTION OF PREFERRED EMBODIMENT

Figure 1:
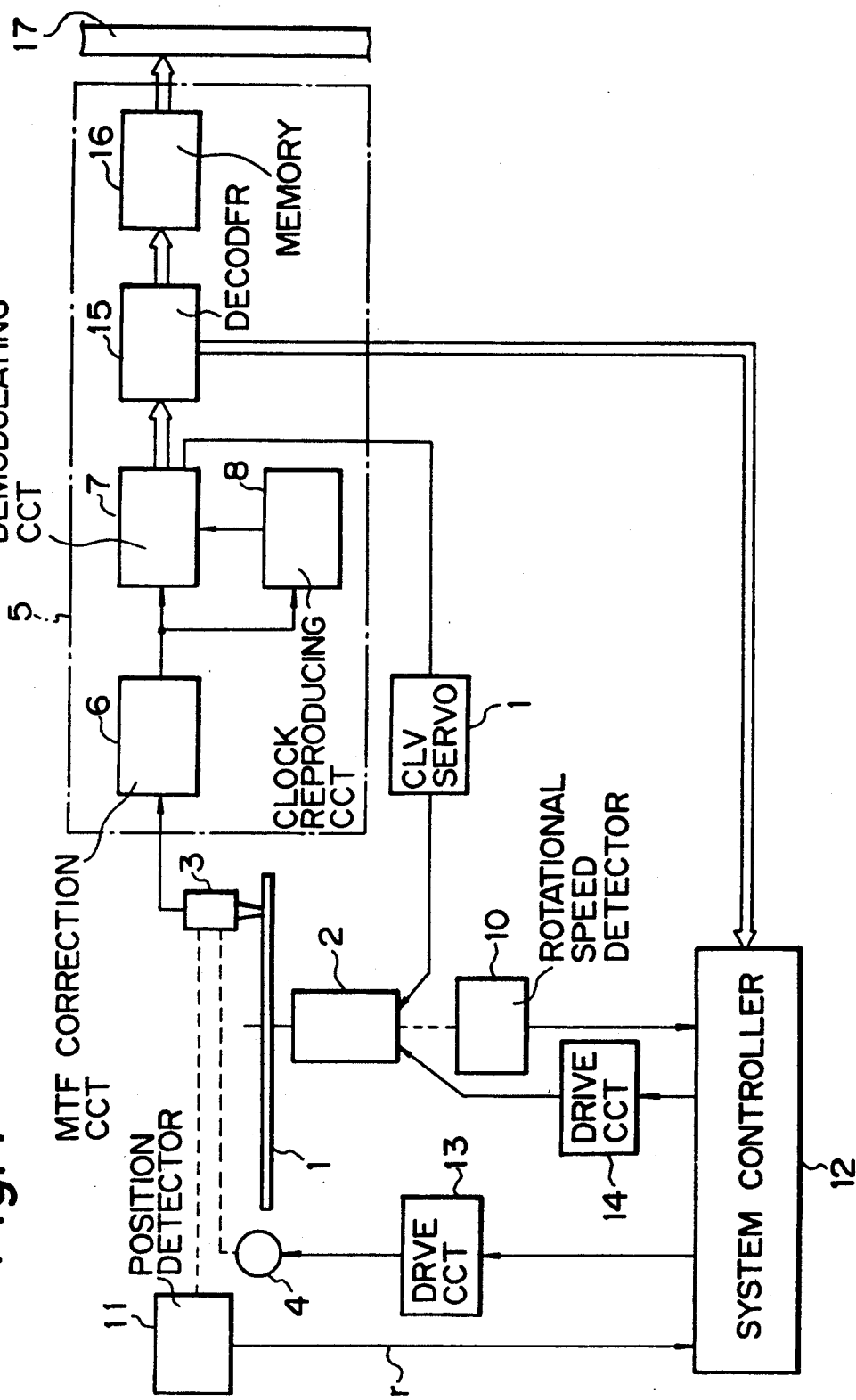
FIG. 1 is a block diagram of a conventional disk playing apparatus.

Before entering into the explanation of the embodiment of the present invention, a conventional disk playing apparatus will be explained as follows. FIG. 1 is a block diagram of a conventional disk playing apparatus for playing a CLV disk. A disk 1 carries digital information data, which is modulated into a format suited for characteristics of the recording medium by means of the EFM (Eight to Fourteen Modulation) method, for example.

The disk 1 is driven by a spindle motor 2. As the disk 1 rotates, the signal recorded on the disk 1 is retrieved by a pickup 3. The pickup 3 is carried on a slider which is movable along a radial direction of the disk 1 and driven by a slider motor 4, so that the information reading point of the pickup 3 (the information reading light spot) is arbitrary positioned in the radial direction of the disk 1. Furthermore, the apparatus is provided with various servo systems such as the focus servo system, tracking servo system, and slider servo system, which are not illustrated in the drawing because they are well known in the art.

The so called RF (radio frequency) signal, i.e., reading signal issued from the pickup 3, is supplied to a signal processing circuit 5. In the signal processing circuit 5, the RF signal is supplied to an MTF (Modulation Transfer Function) correction circuit 6. The MTF correction circuit 6 is configured to compensate for the high-frequency component attenuated by an aperture effect of the the reading light spot of the pickup 3. By the operation of the MTF circuit 6, generation of errors in the demodulation process of the EFM signal is prevented.

The output signal of the MTF correction circuit 6 is supplied to a demodulating circuit 7 and a clock reproducing circuit 8. The clock reproducing circuit 8 is configured to extract a clock component in the EFM signal sequence, generate a pulse signal having a predetermined frequency and synchronized with the extracted clock signal component, and to issue the pulse signal as a reproduced clock signal. Whether or not the clock component is correctly extracted in the clock reproducing circuit 8 is an important factor in preventing the generation of errors in the data demodulation.

The reproduced clock signal issued from the clock reproducing circuit 8 is supplied to the demodulating circuit 7. The demodulating circuit 7 is configured to extract the sync signal, which is inserted at the time of the recording, from a pulse signal obtained by slicing the RF signal having been corrected by the MTF correction circuit 6, and to perform an EFM demodulation process of the pulse signal and the demodulation while effecting the detection and correction of errors. The sync signal 9 issued from the demodulating circuit 7 is supplied to a CLV servo circuit 9.

The CLV servo circuit 9 is configured to perform a phase comparison between the sync signal supplied from the demodulating circuit 7 and a reference signal, and to drive the spindle motor 2 in response to the phase difference between those two signals. By the operation of the CLV circuit 9, the rotational speed of the disk 1 is controlled so that a constant linear velocity is maintained.

The apparatus is further provided with a rotational speed detector 10 which generates a velocity signal having a frequency corresponding to the rotational speed of the spindle motor 2, and a position detector 11 which generates a position signal r having a level corresponding to a radial position of the spindle motor 2. The output signals of the rotational speed detector 10 and the position detector 11 are supplied to a system controller 12. The rotational speed detector 10, for example, consists of a frequency generator which is incorporated in the spindle motor 2 and generates a pulse signal having a frequency corresponding to the rotational speed of the spindle motor 2. On the other hand, the position detector 11 consists of a potentiometer connected to generate a voltage corresponding to a relative position of the slider, carrying the pickup 3, in the radial direction of the disk 1.

In response to a search command supplied from an operation part (not shown), the system controller 12 moves the information reading point of the pickup to a designated address by switching off the CLV servo circuit 9 and supplying a drive signal to the slider motor 4 through a drive circuit 13. Also the system controller 12 calculates a normal rotational speed on the basis of the output signals of the position detector 11 and the rotational speed detector 10, and supplies a drive signal according to the obtained normal rotational speed to the spindle motor 2 through the drive circuit 14.

Data issued from the demodulating circuit 7 is supplied to a decoder 15. The decoder 15 is configured to convert the supplied data into image data or computer data by using a decoding process, and to separate and issue address data. The address data issued from the decoder 15 is supplied to a system controller 12, and data other than the address data is once written in a buffer memory 16, and then transferred to a data bus 17 high a high speed.

In this structure, when a search command is issued, the system controller 12 turns the CLV servo circuit 9 off, and supplies the drive current to the slider motor 4. At the same time, the information reading point of the pickup 3 moves to a designated address, and a drive signal according to a normal rotational speed calculated on the basis of the output signals of the position detector 11 and rotational speed detector 10 is supplied to the spindle motor 2 during the CLV servo circuit 9 is turned off. As a result, the rotational speed of the disk is accelerated or decelerated rapidly, so that the rotational speed reaches the normal rotational speed at the target address. However, as mentioned before, the capacity of the spindle motor 2 to follow changes in the rotational speed is limited so that a time period is required before the rotational speed reaches a normal rotational speed corresponding to the target address. This means that the speed of the search operation remains relatively slow. Furthermore, if the search operation is performed frequently, the spindle motor 2 will receive an electric power a several times the power required during the normal playback. Therefore, with this conventional disk playing apparatus, there are problems of the generation of heat and vibration sounds originated from the torque change.

Embodiments of the present invention will be described in detail with reference to FIGS. 2 through 7 of the accompanying drawings.

In FIG. 2, the disk 1, spindle motor 2, pickup 3, slider motor 4, reading signal processing circuit 5, rotational speed detector 10, system controller 12, driving circuit 13, and data bus, are connected in the same manner as the apparatus shown in FIG. 1. In the signal processing circuit 5 in this embodiment, the MTF correction circuit 6 and clock reproduction circuit 8 are provided with a correction signal c issued from the correction signal generating circuit 19.

The correction signal generating circuit 19 receives the output signal r of the position detector 11 and the output signal $\omega$ of the rotational speed detector 10, and generates the correction signal c which corresponds to the linear velocity of the disk at a radial position on which the pickup 3 reads the recorded information. As an example of the internal structure of the correction signal generating circuit 19 used frequently, there is a method where the correction signal c is derived from a read only memory (ROM) on which output values each corresponding to the input values r and $\omega$ are stored previously.

As described before, the present invention features that the disk is rotated at a predetermined rotational speed independently of the radial position of the information reading point. For this reason, the rotational speed $\omega$ is normally fixed except the case where the selection by the user is enabled. Therefore, for the purpose of explanation, it is assumed in the following explanation that the correction signal c varies in response to the output signal r of the position detector 11.

The MTF correction circuit 6 is configured so that its amplitude characteristic changes with the output signal of the correction signal generating circuit 19 which uses the output signal of the position detector 11 as a parameter, i.e., the radial position, in a manner as shown in FIG. 3. FIG. 3 shows the amplitude characteristic by using the radial position ($r_1$ through $r_3$) as a parameter. More specifically, the axis of ordinates represent the ratio between the input and output signal, and the axis of coordinates represents the frequency. In addition, the radial position $r_1$ is the innermost position among the radial positions $r_1$ through $r_3$, and $r_3$ is the outermost position among the radial positions $r_1$ through $r_3$.

The clock reproducing circuit 8 for example consists of an extraction circuit for extracting the clock component from the RF signal, and a PLL (Phase Locked Loop) circuit for generating a pulse signal having a predetermined frequency, synchronized with the extracted clock component, and configured that the central oscillation frequency of a VCO (Voltage Controlled Oscillator) forming the PLL circuit varies in response to the output signal of the correction signal generating circuit 9.

On the other hand, the output signal of the rotational speed detector 10 is supplied to the CAV servo circuit 18. The CAV servo circuit 18 is configured to generate a difference signal between a predetermined rotational speed value $\omega_0$ designated by the system controller for example, and the output signal of the rotational speed detector 10, and drive the spindle motor 2 in accordance with the difference signal.

The system controller 12 is constructed around a microcomputer, controls operations of the system as a whole, and performs the exchange of control information with the outside. The system controller 12 also performs a control operation to move the information reading point of the pickup 3 to a designated address by supplying a drive signal, through the driving circuit 13, to the slider motor in response to a search command supplied from a control part.

With the construction described above, the rotation of the disk 1 is controlled by the CAV servo circuit 18 so that the rotational speed of the disk equals the predetermined value $\omega_0$ designated by the system controller 12 independently of the radial position of the information reading point of the pickup 3. Furthermore, when the search command is issued, the drive signal is supplied to the slider motor 4 by the system controller 12, so that the information reading point of the pickup 3 moves to the designated address. However, also during this search operation, the rotational speed of the disk 1 is controlled so that the angular velocity equals the predetermined value $\omega_0$ by means of the CAV servo circuit 18.

Therefore, it is unnecessary to accelerate or decelerate the rotational speed of the disk in the search operation, and the capability of the spindle motor 2 to follow the change in the rotational speed is no more questioned. As a result, the time period of the search operation can be shortened. Furthermore, even if the search operation is performed frequently, the generation of heat and vibrations by the spindle motor will not be experienced.

When a CLV disk is rotated at a constant angular velocity, the linear velocity varies depending on the radial position of the information reading point of the pickup 3, which in turn changes the frequency of the RF signal. However, the frequency of the MTF correction circuit 6 varies in response to the correction signal c, the MTF correction function will not be damaged. Thus, the generation of errors is prevented.

Moreover, the frequency of the clock component in the RF signal also changes depending on the radial position. However, the center frequency of the oscillation of the VCO forming the PLL circuit in the clock reproducing circuit 10 also changes in response to the correction signal c, the reproduced clock signal synchronized with the clock component in the RF signal is also obtained, so that the data extraction is performed in a stable manner.

Figure 4:
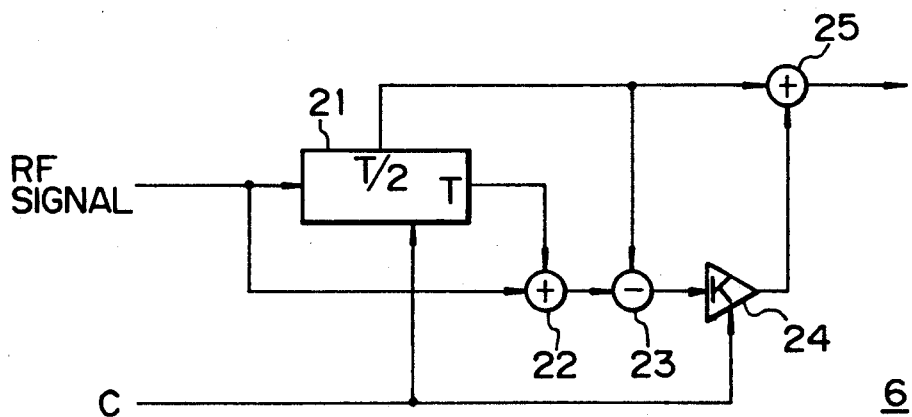
FIG. 4 is a block diagram showing the circuit construction of the MTF correction circuit 6.

FIG. 4 is a circuit block diagram showing an example of the structure of the MTF correction circuit 6. As shown in the figure, the RF signal is supplied to a delay circuit 21 and an adder 22. The delay circuit 21 is configured to issue a first delay signal by delaying the input signal by a time period T $\mu$s corresponding to the correction signal, and a second delay signal by delaying the input signal by a time period T/2$\mu$s. The first delay signal issued from the delay circuit 21 is supplied to the adder 22, and added to the RF signal.

The output signal of the adder 22 is supplied to a subtractor 23, and the second delay signal is subtracted from the output signal of the adder 22. The output signal of the subtractor 23 is supplied to a variable gain amplifier 24. The variable gain amplifier 24 is configured to amplify the input signal at a gain corresponding to the correction signal c. The output signal of the variable gain amplifier 24 is supplied to the adder 25, and added to the second delay signal.

In the MTF correction circuit 6 having the construction described above, for example when the value of T is reduced in response to the correction signal c, the frequency, from which the correction effect is obtained, moves to a higher frequency. The amount of correction in this state is determined by the value of the gain K of the variable gain amplifier 24. However, a complex circuit is need to make the value of T variable. Therefore, as a simple method, the value of T may be set as a constant value, so that only the value of K is varied in response to the position signal r.

Figure 5:
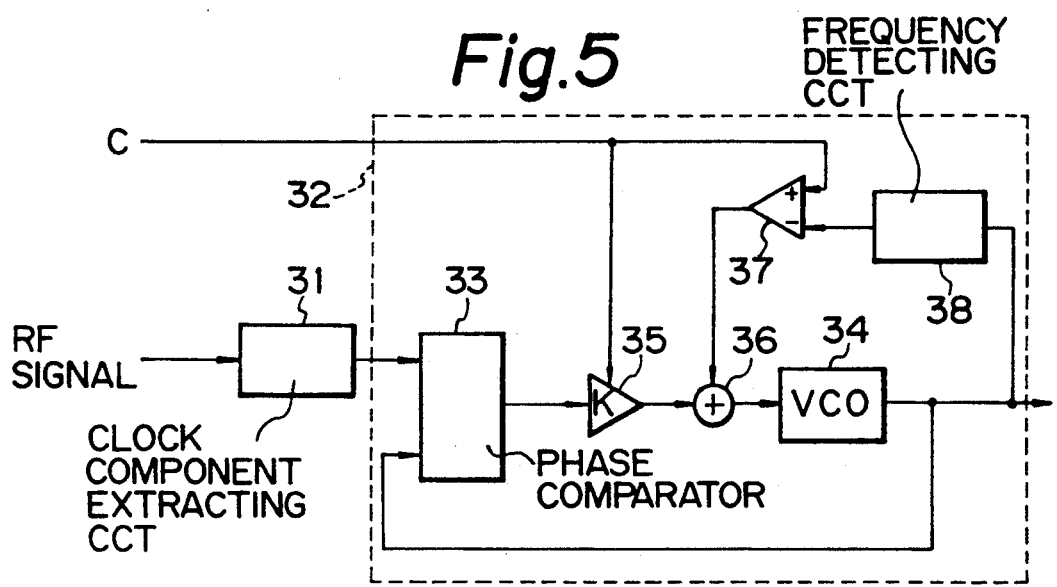
FIG. 5 is a block diagram showing the circuit construction of the clock reproducing circuit.

FIG. 5 is a block diagram showing an example of the construction of the clock reproducing circuit 8. In the figure, the RF signal is supplied to the clock component extracting circuit 31 so that the clock component is extracted. The clock component is supplied to a phase comparator circuit 33 in the PLL circuit 32 and compared with the output signal of the VCO 34, so that a phase difference signal corresponding to the phase difference between the signals is generated. The output signal of the phase comparator circuit 33 is supplied to a variable gain amplifier 35. The correction signal c is supplied to the variable gain amplifier 35. The variable gain amplifier 35 is constructed to amplify the input signal at a gain corresponding to the correction signal c. The output signal of the variable gain amplifier 35 is supplied to the adder 36, and added to an output signal of a differential amplifier 37. The correction signal c is supplied to the positive side input terminal of the differential amplifier 37, and the output signal of the frequency detection circuit 38 is supplied to the negative side input terminal of the differential amplifier 37.

Figure 6:
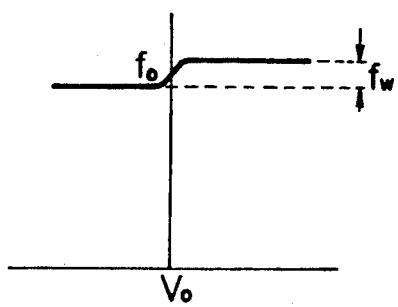
FIG. 6 is a graph showing the characteristic of the VCO.

The variation range of the frequency of the VCO 34 in the clock reproducing circuit 8 described above is determined to be wider than variation ranges in conventional cases. Conventionally, the recorded signal is retrieved while the disk 1 is rotated to attain a constant linear velocity, the center frequency $f_O$ of the VCO is constant independently of the reading radial position. In order to perform the lock-in of the synchronization of the PLL loop in a stable manner and to prevent disturbances in the synchronization of the PLL loop, it is desirable to limit the frequency variation of the VCO within a range which is not excessively wide and to fix the range in the vicinity of the clock frequency, so that the clock signal is extracted in a stable manner. Therefore, in conventional circuits the frequency variation range $f_W$ of the VCO is set in an extremely narrow range in the vicinity of the clock frequency as illustrated in FIG. 6. However, in the case of the apparatus according to the present invention, since the disk 1 is rotated so as to maintain the angular velocity constant, the clock frequency of the reading signal varies widely depending on the radial position. For example, the clock frequency varies as widely as about 2.5 times between the innermost track and the outermost tracks in disks called CDI, CD-ROM. As a result, the VCO 34 must be constructed so that its frequency can be varied widely, and also its characteristic for a stable lock-in of the synchronization as well as its noise-proof characteristic are secured.

By the frequency detection circuit 38, a frequency signal having an amplitude corresponding to the oscillation frequency of the VCO 34 is generated. This frequency signal is supplied to a differential amplifier 37 wherein an error signal corresponding to the difference between the supplied frequency signal and the correction signal c. Since this error signal is added to a control signal of a VCO 34 and used in a feedback operation, the center frequency $f_O$ of the frequency variation range of the VCO 34 varies with the clock frequency, and as a result the characteristic for the lock-in of synchronization and the noise-proof characteristic are maintained at good levels.

Furthermore, the loop gain of the PLL circuit 32 varies depending on the radial position by the operation of the variable gain amplifier 35. As a result, even if the frequency variation range of the clock signal component in the read signal varies depending on the radial position because of the drive of the disk 1 at a constant angular velocity, a stable operation of the PLL circuit 32 is maintained.

Figure 7:
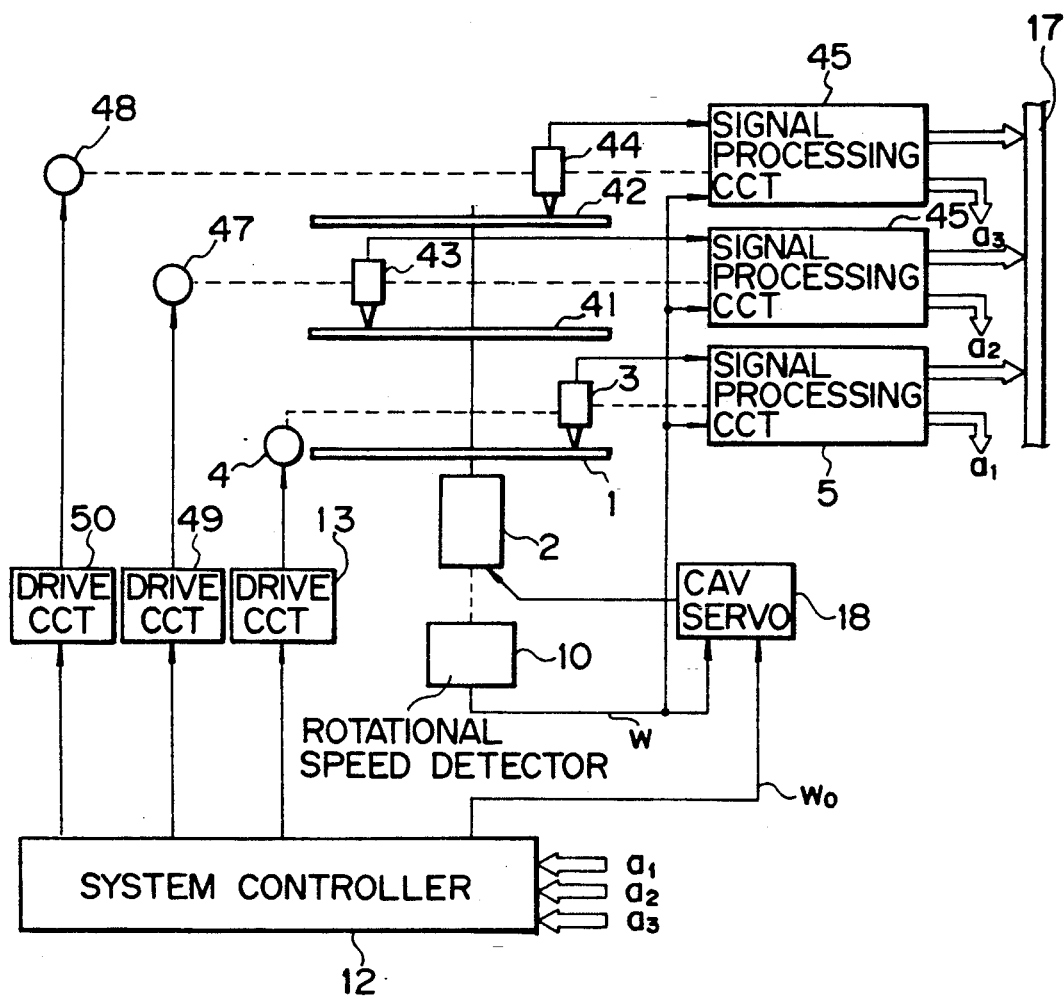
FIG. 7 is a block diagram showing another embodiment of the present invention.

FIG. 7 is a block diagram of another embodiment of the present invention, in which the disk 1, spindle motor 2, pickup 3, slider motor 4, signal processing circuit 5, rotational speed detector 10, system controller 12, drive circuit 13, data bus 17, and CAV servo circuit 18 are arranged and connected in the same manner as the apparatus shown in FIG. 2. However, in this embodiment disks 41 and 42 are mounted, in addition to the disk 1, on the shaft of the spindle motor 2. Signals recorded on the disks 41 and 42 are read by means of pickups 43 and 44, and RF signals issued from the pickups 43 and 44 are respectively supplied to signal processing circuits 45 and 46. Address data $a_1$, $a_2$, $a_3$ respectively issued from the signal processing circuits 5, 45 and 46 are supplied to the system controller 12, and data other than the address data are transferred to the data bus at a high speed.

The pickups 43 and 44 are carried on sliders (not shown) which are driven to move in radial directions of the disks 41 and 42 by means of slider motors 47 and 48 respectively, and the information reading points (information reading light spots) of the pickups 43 and 44 are arbitrary determined in the radial directions of the disks 41 and 42. Drive signals are supplied to the slider motors 47 and 48 from the system controller 12 through drive circuits 49 and 50.

With the structure described above, a plurality of disks are driven by means of a single spindle motor 2, so that signals respectively recorded on the plurality of disks can be reproduced. In this way, the size of the apparatus can be maintain small even if a large memory capacity is realized.

Figure 8:
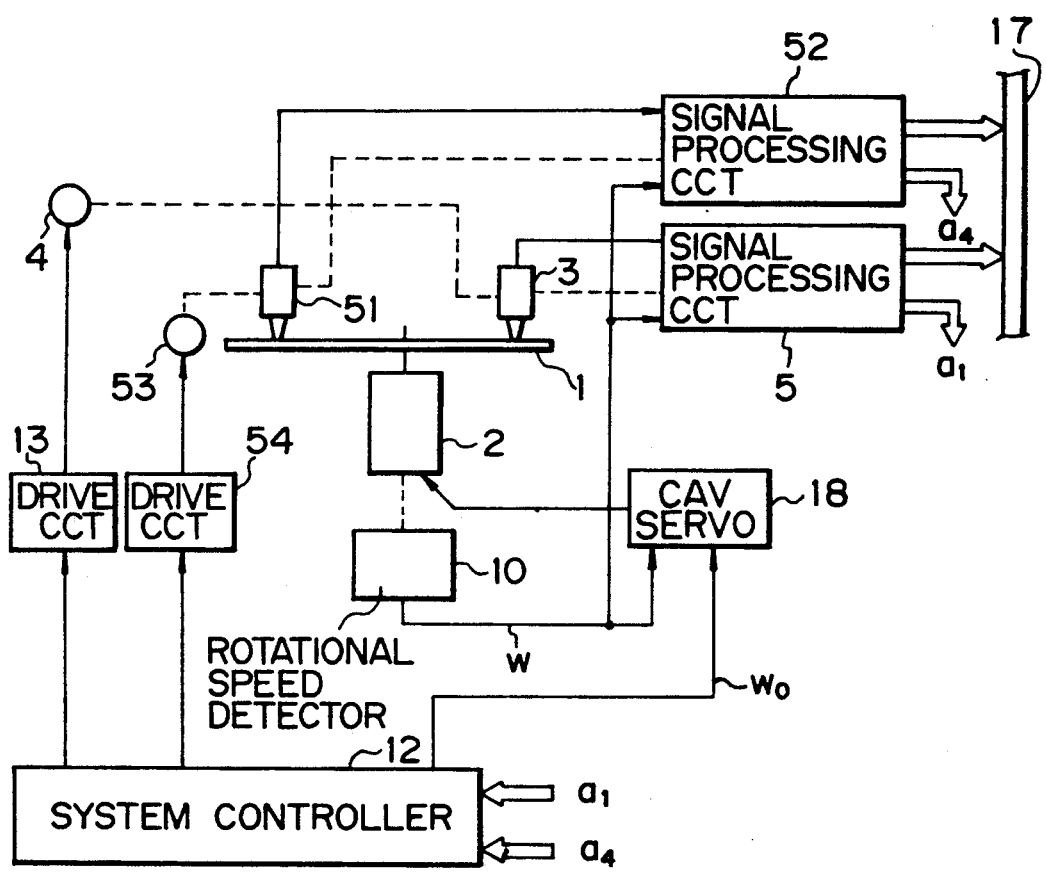
FIG. 8 is a block diagram showing a further embodiment of the present invention.

FIG. 8 is a block diagram showing a further embodiment of the present invention, in which the disk 1, spindle motor 2, pickup 3, slider motor 4, signal processing circuit 5, rotational speed detector 10, system controller 12, drive circuit 13, data bus 17, CAV servo circuit 18 are arranged and connected in the same manner as the apparatus shown in FIG. 2. However, in this example, a pickup 51 for reading information recorded on the disk 1 is provided in addition to the pickup 3. An RF signal issued from the pickup 51 is supplied to a signal processing circuit 52 which are constructed in the same manner as the signal processing circuit 5. Address data $a_1$ and $a_4$ issued from the signal processing circuit 5 and 52 are supplied to the system controller 12. and other data excluding the address data, such as image data are transferred to data bus 17 at a high speed.

The pickup 51 is carried on a slider (not shown) which is driven by a slider motor 53 in a radial direction of the disk 1, so that the information reading point (a light spot for reading information) is arbitrary positioned in the radial direction of the disk 1. A drive signal is supplied to the slider motor 53 from a system controller 12 through a drive circuit 54.

In the structure described above, information recorded on different positions of the same disk can be read separately at the same time. This type of arrangement is suited for uses in which information is accessed quite frequently, or in which information is supplied to different portions.

Furthermore, when the amount of data forming one information item (an image, for example) is extremely large such as in the case of image information, the reading time can be shortened by reading one piece of information by using two pickups jointly, instead of using a single pickup.

In the embodiments described a single MTF circuit whose characteristic varies in response to the correction signal is provided. However, it is also possible to use a plurality of MTF circuits having characteristics different from each other, and to perform a switch control of the plurality of correction circuits in response to the correction signal.

In the embodiments described, it is assumed for explanatory purposes that the rotational speed of the disk $\omega$ is a single predetermined value, and the characteristics of the MTF correction circuit and the PLL circuit are controlled by the correction signal which is determined by using only the position signal as a parameter. However, if it is desired to change the speed at which information is read from the disk, it is conceivable to prepare a plurality of values to be set as the rotational speed so that the selection among the plurality of speed values is enabled. In such a case, as shown in FIG. 2, the characteristics of the MTF circuit and the PLL circuit are controlled in response to the two signals, namely, the position signal and the speed signal.

This feature is provided so that the apparatus can deal with cases where the data quantity supplied to the data bus per unit time is made variable in response to the processing speed of external equipments (such as a microprocessor, CRT, etc.) which receive and process data read from the disk, or an increase in the amount of data which can be processed by the external equipments be attained, or the nominal transfer rate be changed in future.

Moreover, in FIG. 2, the output signal r and the output signal $\omega$ of the rotational speed detector 10 are used as input signals of the correction signal generating circuit 19. However, the output signal r of the position detector 11 may be replaced by the target address used in the search operation or the address code contained in the data read from the disk. Similarly, the output signal $\omega$ of the rotational speed detector 10 may be replaced by a value $\omega_0$ which is supplied to the CAV control circuit 18 as a control target value from the system controller 12. In these cases, similar effects can be attained.

Furthermore, the angular velocity $\omega$ can be set as a constant value independently of the position of the information reading point in a radial direction of the disk. In this case, the linear velocity of inner tracks is slower than the linear velocity of outer tracks, and there will be a room of the angular velocity in the inner tracks for the demodulation operation when the angular velocity is determined so that information in the outer tracks can be demodulated. Therefore, the angular velocity $\omega$ can be determined arbitrary as far as the processing capability in the demodulation stage is not exceeded.

In addition, the frequency of the reading clock signal for reading data from the memory 16 and transmitting it to the data bus 17 is generally set to be a predetermined frequency determined depending on the external equipments. Therefore, if the speed of reading information from the disk is made variable, it will cause an overflow or the generation of a blank portion. For preventing such a problem, it is effective to provide a number of memories as the memory 16 so that a sufficient memory capacity is secured, and to make the system controller 12 to perform interruption and restart of the reading from the disk while monitoring the remaining memory capacity. Otherwise, it is effective to make the system controller 12 to perform interruption and restart of the reading from the disk every time a predetermined unit amount of data is read from the disk.

As specifically described in the foregoing, the disk playing apparatus according to the present invention is provided with rotation speed detection means for generating a velocity signal having a frequency corresponding to the rotational speed of the disk, and the disk is rotated so that the frequency of the speed signal equals a predetermined frequency independently of the radial position of the information reading point of the reading means.

Therefore, in the disk playing apparatus according to the present invention the search time can be shortened since the capability of the spindle motor for following the change in the rotation speed is not required in relation to the search operation. This is because the control of the rotational speed is performed so that the disk is rotated at a constant angular velocity.

In the disk playing apparatus according to the present invention, the generation of heat and vibration of the motor is prevented even if the search operation is performed frequently. This feature is especially suited for a data information apparatus in which reliability is required with the highest priority.

Furthermore, with the present invention it becomes possible to use a single spindle motor to drive a plurality of data disks, or to read information at a plurality of arbitrary addresses by using the same number of pickups. Owing to this feature, reduction in the size of the apparatus, increase in the data amount, and increase in the speed of the data retrieval can be realized.

What is claimed is:

1. A disk playing apparatus for playing a disk on which a signal is recorded by irradiating a recording light beam at a predetermined linear velocity along a recording track, comprising:
   reading means for reading said signal recorded on said disk;
   rotation drive means for rotating said disk about a central axis of said disk;
   rotational speed detection means for generating a speed signal having a frequency corresponding to a rotational speed of said disk driven by means of said rotation drive means;
   signal processing means for processing a read signal read by said reading means, said signal processing means comprising a demodulator for demodulating said read signal obtained by said reading means using a clock signal, a clock signal reproducing circuit for generating said clock signal for said demodulator by using a clock component extracted from said read signal and a correction signal, and a correction signal generating circuit for generating said correction signal according to a linear velocity of said disk at a radial position of said disk at which said signal is being read by said reading means, whereby a frequency of said clock signal gradually varies as said linear velocity varies at said radial position of said disk, wherein said rotation drive means rotates said disk so that the frequency of said speed signal equals a predetermined frequency.

2. The disk playing apparatus as set forth in claim 1, wherein said rotation drive means rotates a plurality of disks loaded in a manner that central axis thereof are mutually aligned, and said reading means comprises a plurality of pickups for reading information recorded on each of said plurality of disks.

3. The disk playing apparatus as set forth in claim 1, wherein said reading means comprises at least two pickups for respectively reading signals recorded on at least two recording positions of said disk.

4. A disk playing apparatus as set forth in claim 1, wherein said clock signal reproducing circuit includes a voltage-controlled oscillator for generating said clock signal, said voltage controlled oscillator having an oscillation frequency determined by said clock component and said correction signal.

5. A disk playing apparatus as set forth in claim 4, further comprising position detection means for detecting said radial position of said reading means on said disk, and wherein an output signal of said position detection means is used in said correction signal generating circuit to generate said correction signal.

6. A disk playing apparatus as set forth in claim 4, wherein said clock signal reproducing circuit uses data contained in said read signal and representing said radial position of said reading means on said disk, for controlling a central frequency of said voltage-controlled oscillator.

7. A disk playing apparatus as set forth in claim 1, wherein said signal processing means further comprises a modulation transfer function correction circuit for effecting a modulation transfer function correction to said read signal and supplying a corrected signal to said demodulator, said correction signal being supplied to said modulation transfer function correction circuit for varying a correction characteristic of said modulation transfer function correction circuit.

* * * * *